United States Patent
Kosseifi et al.

(10) Patent No.: US 9,191,853 B2
(45) Date of Patent: Nov. 17, 2015

(54) MANAGING NETWORK LOAD USING DEVICE APPLICATION PROGRAMS

(71) Applicants: AT&T Mobility II LLC, Atlanta, GA (US); AT&T Intellectual Property I, L.P., Atlanta, GA (US)

(72) Inventors: Mario Kosseifi, Roswell, GA (US); Mark Austin, Roswell, GA (US); Sheldon Kent Meredith, Marietta, GA (US); Trey Norred, III, Woodstock, GA (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 215 days.

(21) Appl. No.: 13/672,101

(22) Filed: Nov. 8, 2012

(65) Prior Publication Data

US 2014/0128064 A1    May 8, 2014

(51) Int. Cl.

| | |
|---|---|
| H04W 4/00 | (2009.01) |
| H04W 28/02 | (2009.01) |
| H04L 12/24 | (2006.01) |
| H04W 4/24 | (2009.01) |
| H04M 15/00 | (2006.01) |
| H04W 4/02 | (2009.01) |
| H04L 12/26 | (2006.01) |

(52) U.S. Cl.
CPC ....... H04W 28/0226 (2013.01); H04L 41/5029 (2013.01); H04M 15/41 (2013.01); H04M 15/43 (2013.01); H04M 15/44 (2013.01); H04W 4/021 (2013.01); H04W 4/24 (2013.01); H04L 43/0817 (2013.01)

(58) Field of Classification Search
CPC .................................................. H04W 28/0226
USPC ............................................... 455/435.1, 406
See application file for complete search history.

(56) References Cited

U.S. PATENT DOCUMENTS

| | | | |
|---|---|---|---|
| 6,754,470 B2 * | 6/2004 | Hendrickson et al. ...... | 455/67.11 |
| 8,121,633 B2 * | 2/2012 | Cormier et al. ............... | 455/525 |
| 8,412,152 B2 * | 4/2013 | Pattabiraman ................ | 455/405 |
| 8,412,154 B1 * | 4/2013 | Leemet et al. ................ | 455/406 |
| 8,503,978 B2 * | 8/2013 | Gaddam et al. ............... | 455/406 |
| 8,874,128 B2 * | 10/2014 | Pyo et al. .................... | 455/456.1 |
| 2007/0136129 A1 * | 6/2007 | Handley et al. .................. | 705/14 |
| 2009/0170477 A1 * | 7/2009 | Bensimon et al. ............. | 455/411 |
| 2010/0235209 A1 * | 9/2010 | Vaswani et al. ................... | 705/7 |
| 2011/0177826 A1 * | 7/2011 | Huang et al. ............... | 455/456.1 |
| 2011/0250901 A1 * | 10/2011 | Grainger et al. ........... | 455/456.1 |
| 2011/0250902 A1 * | 10/2011 | Huang et al. ............... | 455/456.1 |

(Continued)

*Primary Examiner* — Charles Shedrick
(74) *Attorney, Agent, or Firm* — Hartman & Citrin LLC

(57) ABSTRACT

Concepts and technologies are described herein for managing network load using device application programs. An illustrative method includes receiving, at a mobile device, a list of preferred combinations of location area codes ("LACs"), cell identifiers ("CIDs"), and times that data access by the mobile device is to be incentivized, determining a current LAC associated with a location area within which the mobile device is currently located, determining a current CID associated with a base transceiver station to which the mobile device is currently connected, determining a current time, and determining if the current LAC, the current cell ID, and the current time are included as a preferred combination in the list. The method also includes providing an indication that data access by the mobile device is incentivized if the current LAC, the current cell ID, and the current time are included in the list as a preferred combination.

19 Claims, 12 Drawing Sheets

(56) References Cited

U.S. PATENT DOCUMENTS

2012/0064858 A1* 3/2012 Cai et al. ............... 455/406
2012/0108200 A1* 5/2012 Rubin et al. ............ 455/405
2012/0115512 A1* 5/2012 Grainger et al. ........ 455/456.3
2013/0012160 A1* 1/2013 Rubin et al. ............ 455/406
2013/0196621 A1* 8/2013 Guday et al. ........... 455/406
2014/0087688 A1* 3/2014 Chiu et al. ............. 455/406
2014/0120867 A1* 5/2014 Hodges ................... 455/406
2014/0128022 A1* 5/2014 Anderson et al. ....... 455/406

* cited by examiner

MANAGING NETWORK LOAD USING DEVICE APPLICATION PROGRAMS

TECHNICAL FIELD

The concepts and technologies disclosed herein generally relate to network load management. More specifically, the concepts and technologies disclosed herein relate to managing network load using device application programs.

BACKGROUND

In recent years, mobile telecommunications carriers have experienced a dramatic increase in data usage on their networks. This increase in data usage has been caused in part by the increased adoption of smartphones and other devices that utilize data network resources. The emergence of virtual marketplaces that support the distribution of device application programs has also placed a substantial burden on data networks because many of these application programs utilize or even require a data connection to provide some functionality. Subscribers to mobile data service expect to be able to use their data service as they see fit and are not likely to change their data usage behavior to accommodate the needs of a mobile telecommunications carrier with regard to conserving network resources.

SUMMARY

Concepts and technologies are described herein for managing network load using device application programs. According to one aspect disclosed herein, an illustrative method includes receiving, at a mobile device, a list of preferred combinations of location area codes ("LACs"), cell identifiers ("CIDs"), and times that data access by the mobile device is to be incentivized, determining a current LAC associated with a location area within which the mobile device is currently located, determining a current CID associated with a base transceiver station to which the mobile device is currently connected, determining a current time, and determining if the current location area code, the current cell ID, and the current time are included as a preferred combination in the list. The method also includes providing an indication that data access by the mobile device is incentivized if the current location area code, the current cell ID, and the current time are included in the list as a preferred combination. In some embodiments, the method also includes providing an indication that data access by the mobile device is not incentivized if the current LAC, the current CID, and the current time are not included in the list as a preferred combination. In some embodiments, the indication is presented to a user of the mobile device as a visual indication, an audio indication, a haptic indication, or other indication that can be perceived by a user. In some other embodiments, the indication is provided to an application program executing on the mobile device so as to notify a user of the mobile device that data access by the application program is incentivized.

According to another aspect disclosed herein, an illustrative method includes, generating, by an application program executing on a mobile device, a request for data transfer approval, sending the request to a network load application also executing on the mobile device, receiving a response from the network load application program indicating whether a data transfer is approved, conducting the data transfer if the response indicates that the data transfer is approved, and abstaining from conducting the data transfer if the response indicates that the data transfer is not approved. In some embodiments, the method also includes determining if data transfer instructions are included in the response and, if so, conducting the data transfer in accordance with the data transfer instructions. In some embodiments, the method also includes receiving a list of preferred combinations of LACs, CIDs, and times that data access by the mobile device is to be incentivized, determining a current LAC associated with a location area within which the mobile device is currently located, determining a current CID associated with a base transceiver station to which the mobile device is currently connected, determining a current time, determining if the current LAC, the current CID, and the current time are included as a preferred combination in the list, and providing the response indicating that the data transfer is approved if the current LAC, the current CID, and the current time are included as a preferred combination in the list.

According to another aspect disclosed herein, an illustrative method includes receiving, at a network load computing system, network load data, generating a list of preferred combinations of LACs, CIDs, and times that data access by a mobile device is to be incentivized based upon the network load data, and sending the list to a server computer configured to provide the list to the mobile device. In some embodiments, the method also includes starting an expiration timer, monitoring an elapsed time since the expiration timer was started, and, when the expiration timer expires, updating the list based upon new network load data to generate an updated list and sending the updated list to the server computer. In some embodiments, the method also includes receiving a request for an updated list from the server computer, obtaining new network load data, generating the updated list including updated preferred combinations of LACs, CIDs, and times that data access by the mobile device is to be incentivized, and sending the updated list to the server computer. In some embodiments, the method also includes sending the list to a billing system for use by the billing system in generating a bill for data access by the mobile device. In some embodiments, the method also includes receiving a charging data record from a billing system, comparing the charging data record to the preferred combinations contained within the list, determining if a match exists between the charging data record and the preferred combinations contained within the list, notifying the billing system that a match exists or does not exist, and, if a match exists, providing details of the match to the billing system for use by the billing system in generating a bill for data access by the mobile device.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
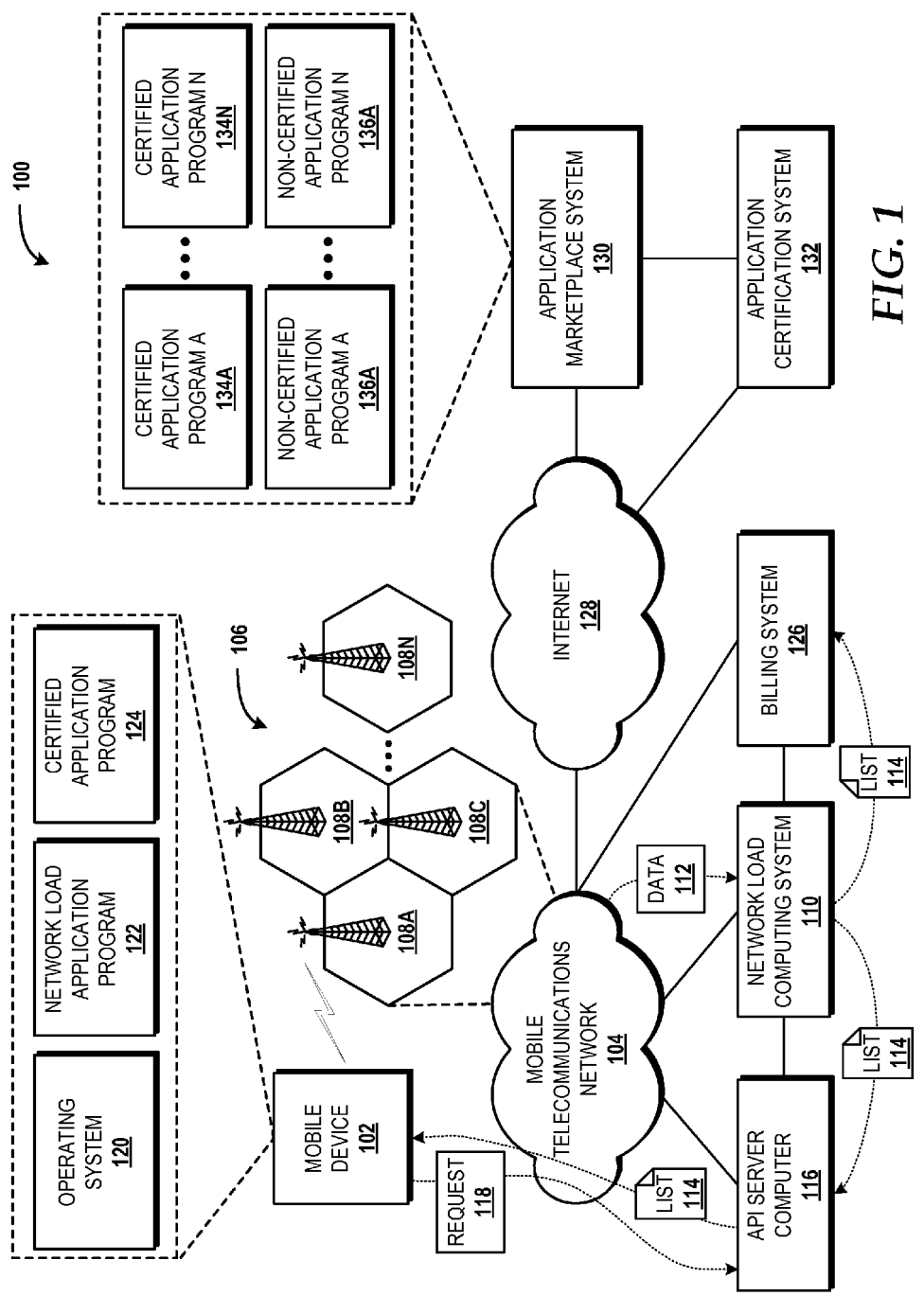
FIG. 1 is a block diagram illustrating aspects of an illustrative operating environment for various concepts disclosed herein.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, distributed computing systems, microprocessor-based or programmable consumer electronics, minicomputers, mainframe computers, routers, switches, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of managing network load using device application programs will be presented.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from illustrative embodiments described herein.

The operating environment 100 shown in FIG. 1 includes a mobile communications device ("mobile device") 102 operating on or in communication with a mobile telecommunications network 104. The mobile device 102 may be a cellular telephone, a smartphone, a mobile computer, a tablet computer, or other computing device that is configured with an integrated or external access component that facilitates wireless communication with the mobile telecommunications network 104. In some embodiments, the access component is a cellular telephone that is in wired or wireless communication with a computer to facilitate a tethered data connection to the mobile telecommunications network 104. In some other embodiments, the access component includes a wireless transceiver configured to send data to and receive data from the mobile telecommunications network 104 and a universal serial bus ("USB") or another communication interface for connection to the computer to enable tethering. In any case, the mobile device 102 can wirelessly communicate with the mobile telecommunications network 104 over an air interface in accordance with one or more radio access technologies to send and receive data. The mobile device 102 may also initiate, receive, and/or maintain voice calls with one or more other devices (not shown). The mobile device 102 may also exchange Short Message Service ("SMS") messages, email, and/or other messages to other devices.

The mobile telecommunications network 104 includes one or more radio access networks ("RANs"). The mobile telecommunications network 104 also includes a wireless wide area network ("WWAN"), which may, in turn, include a circuit-switched core network ("CS CN"), a packet-switched core network ("PS CN"), and/or an IP multimedia subsystem ("IMS") core network. The WWAN can utilize one or more mobile telecommunications technologies to provide voice and/or data services via one or more RANs to a WWAN component (not shown) of the mobile device 102. The mobile telecommunications technologies may include, but are not limited to, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other 802.XX technologies, and/or the like. A RAN can utilize various channel access methods (which may or may not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and/or the like to provide an air interface to the mobile device 102. A RAN may be a GSM RAN ("GRAN"), a GSM EDGE RAN ("GERAN"), a UMTS Terrestrial Radio Access Network ("UTRAN"), an E-UTRAN, any combination thereof, and/or the like. The mobile device 102 can communicate with one or more RANs that utilize the same or different radio access technologies. As such, in some embodiments, the mobile device 102 is a multi-mode communications device.

Data communications can be provided by the mobile telecommunication network 104 using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access standards. The mobile telecommunications network 104 may be configured to provide voice and/or data communications with any combination of the above technologies. The mobile telecommunications network 104 may be configured to or adapted to provide voice and/or data communications in accordance with future generation technologies.

The mobile telecommunications network 104 provides a mobile data service to the mobile device 102 within a service area that includes one or more location areas, each of which includes one or more cell sites. In the illustrated example, the mobile telecommunication network 104 includes a location area 106 that includes a plurality of cells 108A-108N (hereinafter referred to collectively or generically as "cells 108"). Each of the cells 108 includes one or more base transceiver stations ("BTSs"). The BTSs are part of a RAN and provide an air interface between the mobile telecommunications network 104 and the mobile device 102. The term "base transceiver station" is used herein to broadly encompass any equipment that provides an air interface between the mobile telecommunications network 104 and the mobile device 102. A BTS, therefore, may include, but is not limited to including, a BTS as utilized in GSM networks, a Node B as utilized in UMTS networks, or an eNodeB as utilized in LTE networks.

The location area 106 is associated with a Location Area Identity ("LAI"). An LAI includes a Mobile Country Code ("MCC"), a Mobile Network Code ("MNC"), and a Location Area Code ("LAC"). The MCC is used to uniquely identify a country. The MNC is used to uniquely identify a mobile telecommunications network, such as the mobile telecommunications network 104. The LAC is used to uniquely identify a location area within a mobile telecommunications network, such as the location area 106 within the mobile telecommunications network 104. Each of the cells 108 is associated with a unique cell identifier ("CID").

As will be described in greater detail below, LAC, CID, and time are used in combination to identify locations at which and times during which data transfer to and/or from the mobile device 102 is preferred by a mobile telecommunications carrier that owns and/or operates the mobile telecommunications network 104. Combinations of LAC, CID, and time that data transfer is preferred are sometimes referred to herein collectively as preferred data transfer criteria.

The illustrated mobile telecommunications network 104 is in communication with a network load computing system 110. The network load computing system 110 receives network load data ("data") 112 from the mobile telecommunications network 104 and utilizes the data 112 to generate a list of preferred combinations of LACs, CIDs, and times ("list 114") that data access by the mobile device 102 is preferred.

In some embodiments, the data 112 includes historic network load data. Historic network load data is used herein to describe data obtained by the network load computing system 110 based upon network load experienced by the mobile telecommunications network 104 in the past or otherwise in non-real-time. In some other embodiments, the data 112 includes current network load data. Current network load data is used herein to describe network load data that is obtained by the network load computing system 110 based upon a network load experienced by the mobile telecommunications network 104 in real-time or near real-time. Real-time, in this context, is the actual time during which a network load is experienced by the mobile telecommunications network 104. Near real-time, in this context, is the actual time during which a network load is experienced by the mobile telecommunications network 104 plus a delay on the order of microseconds or milliseconds. What constitutes near-real time network load data versus historic network load data can be defined by the owner and/or operator of the network load computing system 110, the mobile telecommunications network 104, and/or another entity. It should be understood that real-time network load data associated with a real-time network load of the mobile telecommunications network 104 and near real-time network load data associated with a near real-time network load of the mobile telecommunications network 104 might be received by network load computing system 110 with delay caused by latency and/or other network phenomena.

The network load computing system 110, in some embodiments, requests the data 112 from the mobile telecommunications network 104 and, more particularly, one or more network elements operating within the mobile telecommunications network 104. As such, the network load computing system 110 can be in a pull configuration with one or more network elements of the mobile telecommunications network 104. In some other embodiments, the network load computing system 110 receives the data 112 pushed by one or more network elements of the mobile telecommunications network 104. Although the network load computing system 110 is illustrated as being external to the mobile telecommunications network 104, the network load computing system 110 can operate within the mobile telecommunications network 104.

In some embodiments, the network load computing system 110 analyzes the data 112 to determine the network load experienced by the mobile telecommunications network 104 on a per cell basis for each of the cells 108, and the time(s), if ever, at which the network load at each of the cells 108 is in a preferred state. A preferred state, in some embodiments, is a state in which a cell or other portion of the mobile telecommunications network 104 experiences a network load below a network load threshold, which can be defined by the owner and/or operator of the mobile telecommunications network 104 or some other entity. The network load computing system 110 can generate the list 114 including a LAC and CID associated with one or more of the cells 108 and one or more times during which each of these cells experiences a network load below a network load threshold. The network load computing system 110 can identify such LAC/CID/time combinations as preferred combinations that data access by the mobile device 102 is preferred.

The list 114 can include preferred combinations of LACs, CIDs, and times that data access by mobile devices, including the mobile device 102, is preferred. In some embodiments, the list 114 includes preferred combinations of LACs, CIDs, and times that data access by all devices operating on the mobile telecommunications network 104 is preferred. These devices may include devices that are roaming on the mobile telecommunications network 104. The list 114 alternatively may be particular to the mobile device 102 or to a set of mobile devices, for example, that share a class of service.

The illustrated network load computing system 110 is in communication with an application program interface ("API") server computer 116. The API server computer 116 provides one or more APIs that can be utilized by one or more application programs executing on the mobile device 102 to obtain the list 114 for managing data transfers to and/or from the mobile device 102 and, thereby, conserving data resources of the mobile telecommunications network 104 in specific locations and during specific times, while incentivizing the use of data resources of the mobile telecommunications network 104 in specific locations and during specific times. In the illustrated example, the API server computer 116 provides the list 114 to the mobile device 102 in response to a request 118 received from the mobile device 102. The API server computer 116 alternatively may push the list 114 to the mobile device 102.

In some embodiments, a mobile telecommunications carrier incentivizes the use of data resources provided by the mobile telecommunications network 104 by applying a monetary bill credit to a subscriber's bill. In some other embodiments, a mobile telecommunications carrier incentivizes the use of data resources provided by the mobile telecommunications network 104 by applying a data block credit to a subscriber's bill. A data block may be in units of bytes, kilobytes, megabytes, gigabytes, or any other unit of data.

The illustrated mobile device 102 is configured to execute an operating system 120, a network load application program 122, and a certified application program 124. The operating system 120 is a program for controlling the operation of the mobile device 102. According to various embodiments, the operating system 120 may be SYMBIAN OS from SYMBIAN LIMITED, WINDOWS mobile OS from Microsoft Corporation of Redmond, Wash., WINDOWS phone OS from Microsoft Corporation, PALM WEBOS from Hewlett-Packard Company of Palo Alto, Calif., BLACKBERRY OS from Research In Motion Limited of Waterloo, Ontario, Canada, IOS from Apple Inc. of Cupertino, Calif., or ANDROID OS from Google Inc. of Mountain View, Calif. Although a single operating system 120 is shown, multiple operating systems are contemplated. Other operating systems are contemplated.

The network load application program 122 executes on top of the operating system 120. The network load application program 122 provides functionality to the mobile device 102 to receive the list 114, determine a current LAC associated with a location area, such as the LA 106, within which the mobile device 102 is currently located, determine a current CID associated with a BTS to which the mobile device 102 is currently connected, and determine a current time. The network load application program 122 compares the current LAC, the current CID, and the current time to the list 114 to determine if the current LAC, the current CID, and the current time are included in the list 114 as a preferred combination. If so, the network load application program 122 can cause the mobile device 102 to provide an indication that data access by the mobile device 102 is incentivized. If not, the network load application program 122 can cause the mobile device 102 to provide an indication that data access by the mobile device 102 is not incentivized.

An indication that data access is or is not incentivized can include a visual indication. In some embodiments, the visual indication is presented on a display of the mobile device 102. The visual indication can include a letter, a number, a character, a symbol, a text string, a static image, an animated image, a movie, and/or any other visual content that can be used to convey to a user of the mobile device 102 that data access is or is not incentivized. Custom visual indications generated by or for a user of the mobile device 102 are also contemplated. A visual indication can be presented on the display of the mobile device 102 via various mechanisms including, but not limited to, a toast notification or other notification, an email, and a text message. In some other embodiments, the visual indication is presented via an indicator light, such as a light-emitting diode ("LED"), of the mobile device 102.

An indication that data access is or is not incentivized can include an audio indication. In some embodiments, the audio indication is presented via a speaker of the mobile device 102 including a built-in speaker and/or a speaker attached to the mobile device 102, for example, through a headphone jack. The audio indication can include any sound.

An indication that data access is or is not incentivized can include a haptic indication. In some embodiments, the haptic indication is provided via a vibration mechanism of the mobile device 102.

The aforementioned indications rely on the capability of a user of the mobile device 102 to perceive an indication via their sense of sight, hearing, or touch. It should be understood, however, that an indication that data access is or is not incentivized can include an indication that is capable of perception by a user of the mobile device 102 through any sensory system of the user including, but not limited to, sight, hearing, taste, smell, touch, balance, acceleration, temperature, kinesthetic, pain, any sense that is normally stimulated from within the body of the user, or any combination thereof.

An indication that data access is or is not incentivized can be provided by the network load application program 122 for any data access by the mobile device 102. For example, the indication can serve as a notification to a user of the mobile device 102 that using the mobile device 102 to surf the web, check email, or play an online game is equally incentivized.

An indication that data access is or is not incentivized can be provided by the network load application program 122 to the certified application program 124 so as to notify a user of the mobile device 102 that data access by the certified application program 124 is incentivized or not.

The certified application program 124 executes on top of the operating system 120. The certified application program 124 is any application program that receives data from and/or sends data to the mobile telecommunications network 104 and that has been certified through a certification process to certify that the application program can utilize the network load application program 122 to determine when data access is incentivized and when data access is not incentivized.

The illustrated mobile telecommunications network 104 is also in communication with a billing system 126. The billing system 126 is a computerized system that executes billing processes in a billing cycle to prepare billing statements for subscribers of data and other services provided via the mobile telecommunications network 104.

The illustrated mobile telecommunications network 104 is in communication with an internet 128, such as the Internet. The mobile device 102 can access the internet 128 via the mobile telecommunications network 104, as in the illustrated embodiment. The illustrated internet 128 is in communication with an application marketplace system 130 and an application certification system 132.

The application marketplace system 130 hosts a virtual marketplace through which a user can browse, search, download, and/or purchase application programs. In the illustrated example, the application marketplace system 130 provides a plurality of certified applications 134A-134N and a plurality of non-certified applications 136A-136N. A user can access the application marketplace system 130 via the mobile device 102. In some embodiments, the mobile device 102 accesses the application marketplace system 130 via a marketplace application (not shown) that is installed on the mobile device 102. In some other embodiments, the mobile device 102 accesses the application marketplace system 130 via a web browser configured to access one or more uniform resource locators ("URLs") associated with the application marketplace system 130.

The application certification system 132 provides an application certification process through which application programs can be certified based upon compliance with certification criteria established by or for a mobile telecommunications carrier that owns and/or operates the mobile telecommunications network 104. In some embodiments, the application certification process includes testing a certification candidate application program for interoperability with the network load application program 122 to access the list 114 to determine when data access is incentivized and when data access is not incentivized. In some embodiments, the application certification process includes testing a certification candidate application program to obtain data usage characteristics and comparing the data usage characteristics to data usage limits to which the certification candidate application program must adhere to be certified. In some embodiments, the application certification process includes testing a certification candidate application program to determine whether the certification candidate application program has an upload and download setting that, when enabled, causes the certification candidate application program to enter a data conservation mode that limits data usage by the certification candidate application program. In some embodiments, the application certification process includes testing a certification candidate application program to determine whether the certification candidate application program has a default value set to a data conservation mode that limits data usage by the certification candidate application program. In some embodiments, the application certification process includes testing a certification candidate application program to determine whether the certification application program strictly complies with a requirement to limit data usage to the preferred combinations of LAC, CID, and times set forth in the list 114. An illustrative application certification process is described herein below with respect to FIG. 9.

In some embodiments, the application certification system 132 provides an application certification process through which an application program can be certified after the application program has been approved through an approval process provided, for example, by an owner and/or operator of the application marketplace system 130. In this manner, a certification candidate application program can be provided to the application marketplace system 130 even upon failure to comply with the certification requirements of the application certification process provided by the application certification system 132.

The application marketplace system 130 can provide a section dedicated to certified application programs. In some embodiments, an application program is identified with a certification distinction such as a letter, number, symbol, graphic, text, or other visual distinction to signify to users that the application program has been certified.

It should be understood that some implementations of the operating environment 100 include multiple mobile devices 102, multiple mobile telecommunications networks 104, multiple network load computing systems 110, multiple API server computers 116, multiple operating systems 120, multiple network load application programs 122, multiple certified application programs 124, multiple billing systems 126, multiple internets 128, multiple application marketplace systems 130, and/or multiple application certification systems 132. Thus, the illustrated embodiment should be understood as being illustrative, and should not be construed as being limiting.

Figure 2:
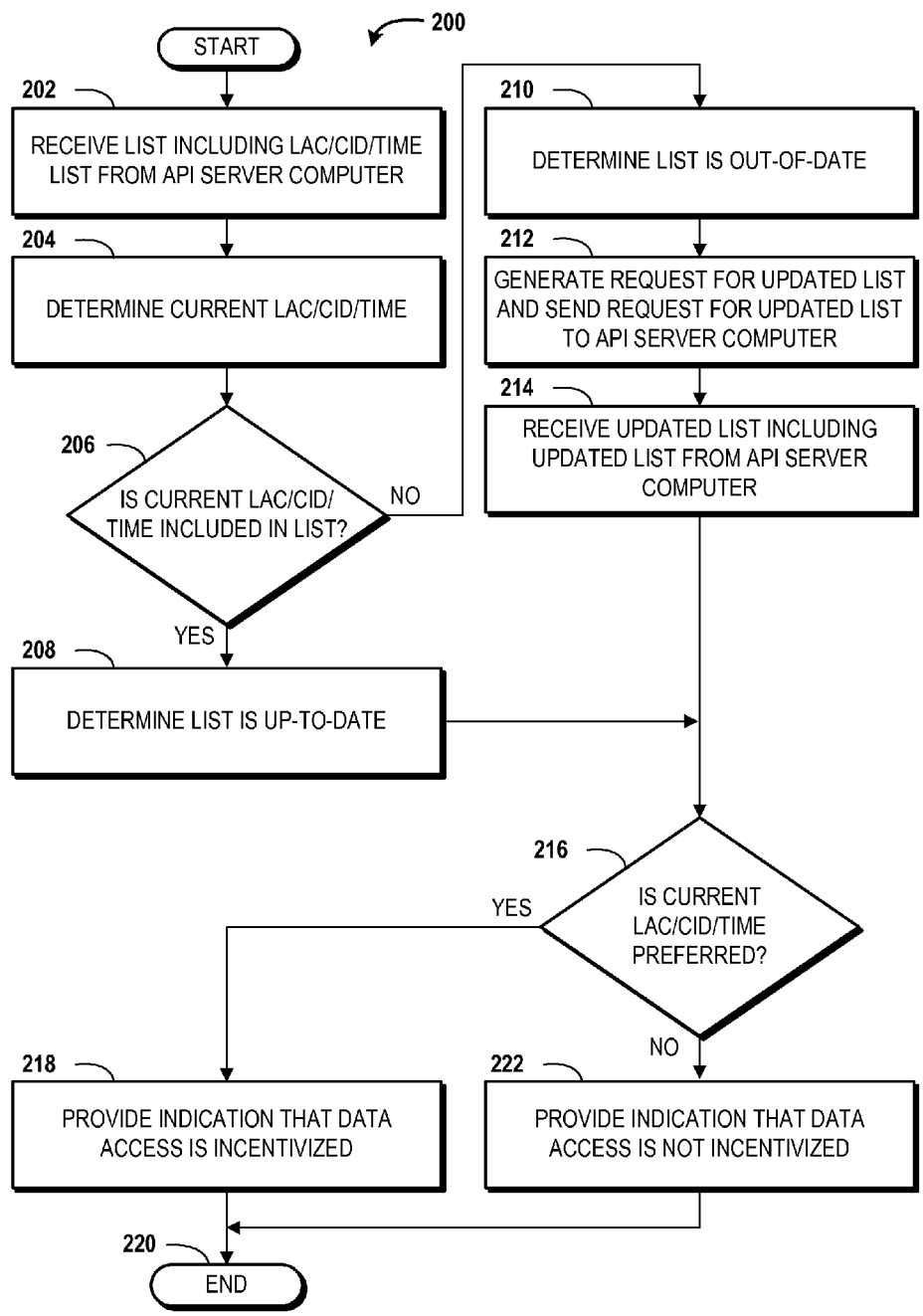
FIG. 2 is a flow diagram illustrating aspects of a method for incentivizing data transfer in accordance with preferred data transfer criteria, according to an illustrative embodiment.

Turning now to FIG. 2, a flow diagram illustrating aspects of a method 200 for incentivizing data transfer in accordance with preferred data transfer criteria will be described, according to an illustrative embodiment. It should be understood that the operations of the illustrative methods disclosed herein are not necessarily presented in any particular order and that performance of some or all of the operations in an alternative order(s) is possible and is contemplated. The operations have been presented in the demonstrated order for ease of description and illustration. Operations may be combined, separated, added, omitted, modified, and/or performed simultaneously or in another order without departing from the scope of the subject disclosure.

It also should be understood that the illustrated methods can be ended at any time and need not be performed in their entirety. Some or all operations of the methods, and/or substantially equivalent operations, can be performed by execution of computer-executable instructions included on a computer-readable storage media, as defined below. The term "computer-executable instructions," and variants thereof, as used in the description and claims, is used expansively herein to include routines, application programs, software, application modules, program modules, components, data structures, algorithms, and the like. Computer-executable instructions can be implemented on various system configurations, including single-processor or multiprocessor systems, distributed computing systems, minicomputers, mainframe computers, personal computers, hand-held computing devices, microprocessor-based, programmable consumer electronics, combinations thereof, and the like.

Thus, it should be appreciated that the logical operations described herein may be implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof. As used herein, "cause a processor to perform operations" includes causing a processor of a computing system, such as the mobile device 102, the network load computing system 110, the API server computer 116, the billing system 126, or the application certification system 132, to perform one or more operations of the operations and/or causing the processor to direct other components of the computing system to perform one or more of the operations.

The method 200 is described as being performed by the mobile device 102 (shown in FIG. 1) executing the network load application program 122. The method 200 begins and proceeds to operation 202, wherein the mobile device 102 receives a list of LAC, cell ID, and time combinations, such as the list 114, from the API server computer 116. From operation 202, the method 200 proceeds to operation 204, wherein the mobile device 102 determines a current LAC, a current CID, and a current time.

From operation 204, the method 200 proceeds to operation 206, wherein the mobile device 102 determines if the current LAC, the current CID, and the current time are included in the list. If the mobile device 102 determines the current LAC, the current CID, and the current time are included in the list, the method 200 proceeds to operation 208, wherein the mobile device 102 determines the list is up-to-date. If the mobile device 102 determines the current LAC, the current CID, and the current time are not included in the list, the method 200 proceeds to operation 210, wherein the mobile device 102 determines the list is out-of-date and, in response, generates a request for an updated list and sends the request to the API server computer 116 at operation 212. From operation 212, the method 200 proceeds to operation 214, wherein the mobile device 102 receives an updated list of LAC, CID, and time combinations from the API server computer 116.

From operation 208 or from operation 214, the method 200 proceeds to operation 216, wherein the mobile device 102 determines if the current LAC, CID, and time combination is identified in the list as a preferred LAC/CID/time combination. If the mobile device 102 determines the current LAC, CID, and time combination is identified in the list as a preferred LAC/CID/time combination, the method 200 proceeds to operation 218, wherein the mobile device 102 provides an indication that data access is incentivized. The indication may be any indication or combination of indications described herein above. The method 200 then proceeds to operation 220, wherein the method 200 may end. If, at operation 216, the mobile device 102 determines the current LAC, CID, and time combination is not identified in the list as a preferred LAC/CID/time combination, the method 200 proceeds to operation 222, wherein the mobile device 102 provides an indication that data access is not incentivized. The method 200 then proceeds to operation 220, wherein the method 200 may end.

Figure 3:
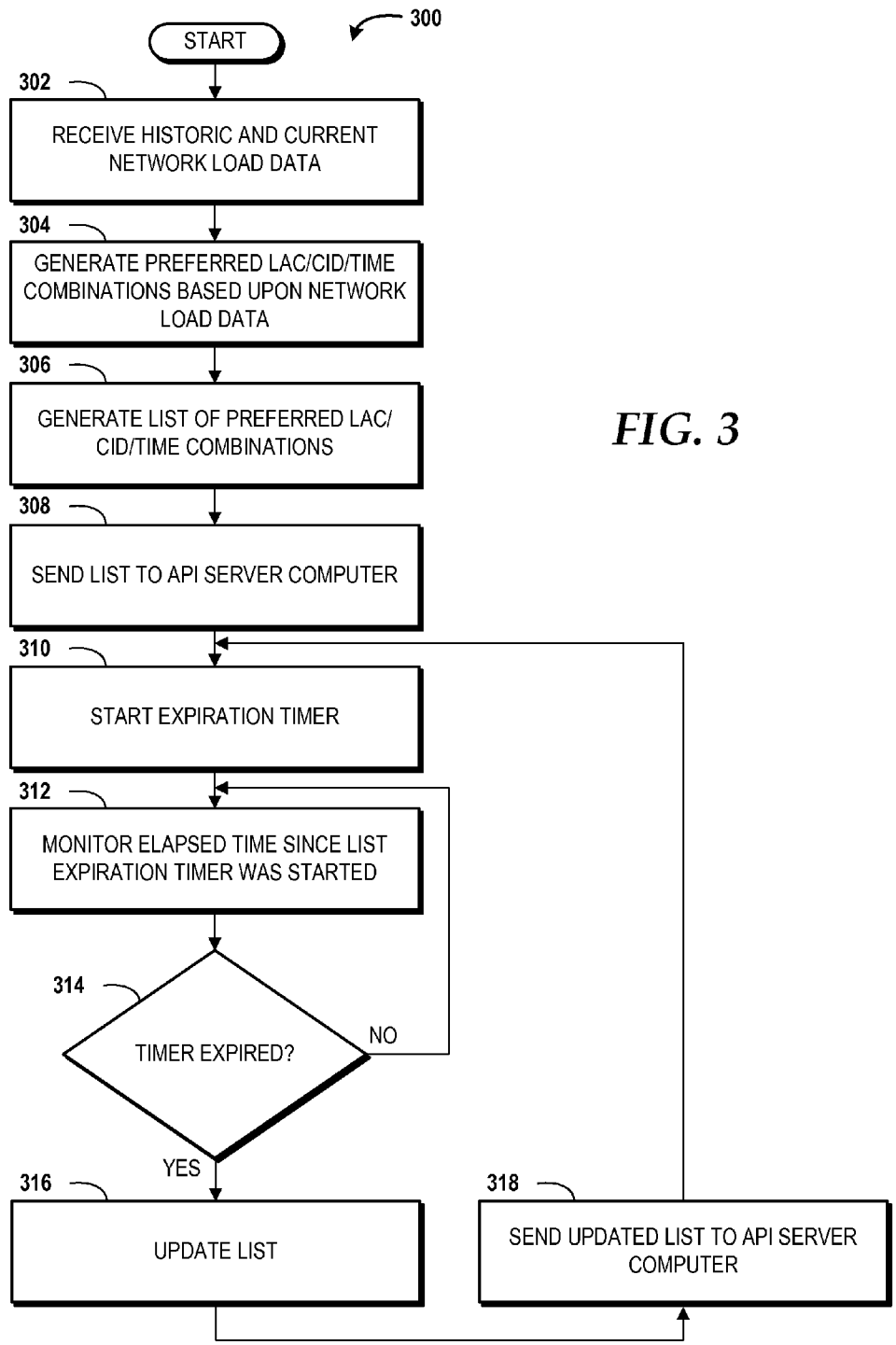
FIG. 3 is a flow diagram illustrating aspects of a method for providing preferred data transfer criteria to an application program interface ("API") server computer, according to an illustrative embodiment.

Turning now to FIG. 3, a flow diagram illustrating aspects of a method 300 for providing preferred data transfer criteria to an API server computer will be described, according to an illustrative embodiment. The method 300 is described as being performed by the network load computing system 110 (shown in FIG. 1). The method 300 begins and proceeds to operation 302, wherein the network load computing system 110 receives historic and current network load data. In some embodiments, the network load computing system 110 alternatively receives historic or current network load data. From operation 302, the method 300 proceeds to operation 304, wherein the network load computing system 110 generates preferred LAC/CID/time combinations based upon the network load data. From operation 304, the method 300 proceeds to operation 306, wherein the network load computing system 110 generates a list of the preferred LAC/CID/time combinations. From operation 306, the method 300 proceeds to operation 308, wherein the network load computing system 110 sends the list to the API server computer 116.

From operation 308, the method 300 proceeds to operation 310, wherein the network load computing system 110 starts an expiration timer. At operation 312, the network load computing system 110 monitors the elapsed time since the list expiration timer was started. From operation 312, the method 300 proceeds to operation 314, wherein the network load computing system 110 determines if the expiration timer has expired. If the network load computing system 110 determines the expiration timer has expired, the method 300 returns to operation 312, wherein the elapsed time since the expiration timer was started continues to be monitored. If the network load computing system 110 determines the expiration timer has not expired, the method 300 proceeds to operation 316, wherein the network load computing system 110 updates the list based upon updated network load data. From operation 316, the method 300 proceeds to operation 318, wherein the network load computing system 110 sends the updated list to the API server computer 116, after which the method 300 returns to operation 310, wherein a new expiration timer is started. By executing the operations of the method 300, the network load computing system 110 can provide up-to-date LAC/CID/time combinations to the API server computer 116, which can then provide the combinations to the mobile device 102 for determining whether to provide an indication that data access is incentivized.

Figure 4:
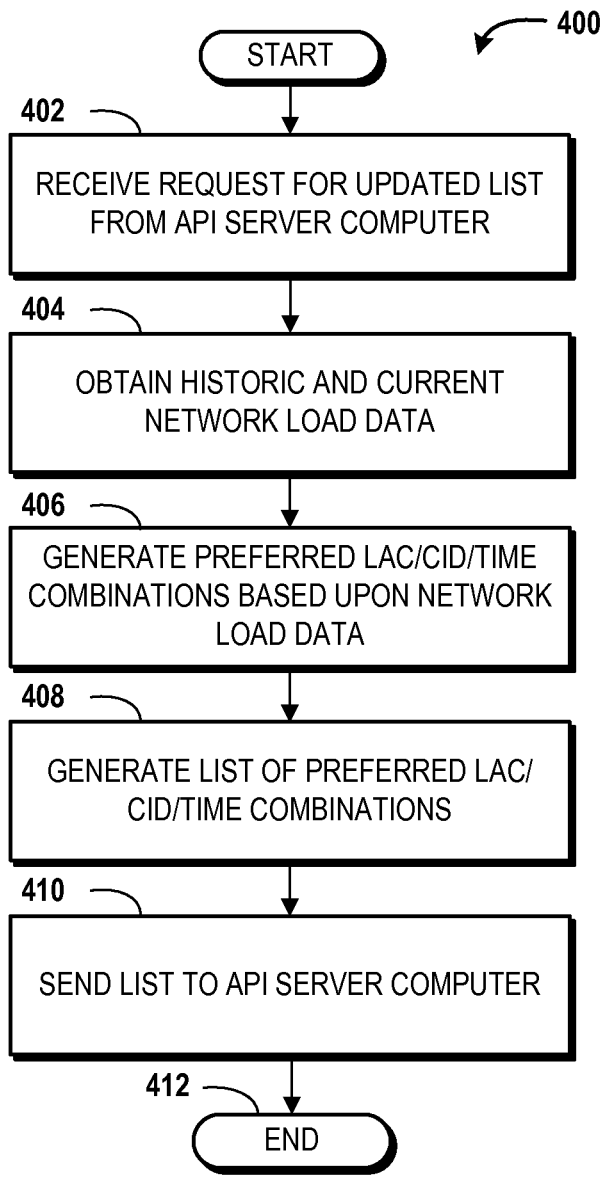
FIG. 4 is a flow diagram illustrating aspects of a method for generating preferred data transfer criteria, according to an illustrative embodiment

Turning now to FIG. 4, a flow diagram illustrating aspects of a method 400 for generating preferred data transfer criteria will be described, according to an illustrative embodiment. The method 400 is described as being performed by the network load computing system 110. The method 400 begins and proceeds to operation 402, wherein the network load computing system 110 receives a request for an updated list from the API server computer 116. In response, at operation 404, the network load computing system 110 obtains historic and current network load data. In some embodiments, the network load computing system 110 alternatively obtains historic or current network load data. From operation 404, the method 400 proceeds to operation 406, wherein the network load computing system 110 generates preferred LAC/CID/time combinations based upon the network load data. From operation 406, the method 400 proceeds to operation 408, wherein the network load computing system 110 generates a list of the preferred LAC/CID/time combinations. From operation 408, the method 400 proceeds to operation 410, wherein the network load computing system 110 sends the list to the API server computer 116. From operation 410, the method 400 proceeds to operation 412, wherein the method 400 may end.

In some embodiments, the network load computing system 110 executes the operations of the method 400 simultaneously with the operations of the method 300 described herein above with reference to FIG. 3. In this manner, the network load computing system 110 can provide up-to-date LAC/CID/time combinations to the API server computer 116 proactively through the timer-based method 300 and responsively to requests from the API sever computer 116 to ensure the most up-to-date list of preferred LAC/CID/time combinations is available to the mobile device 102.

Figure 5:
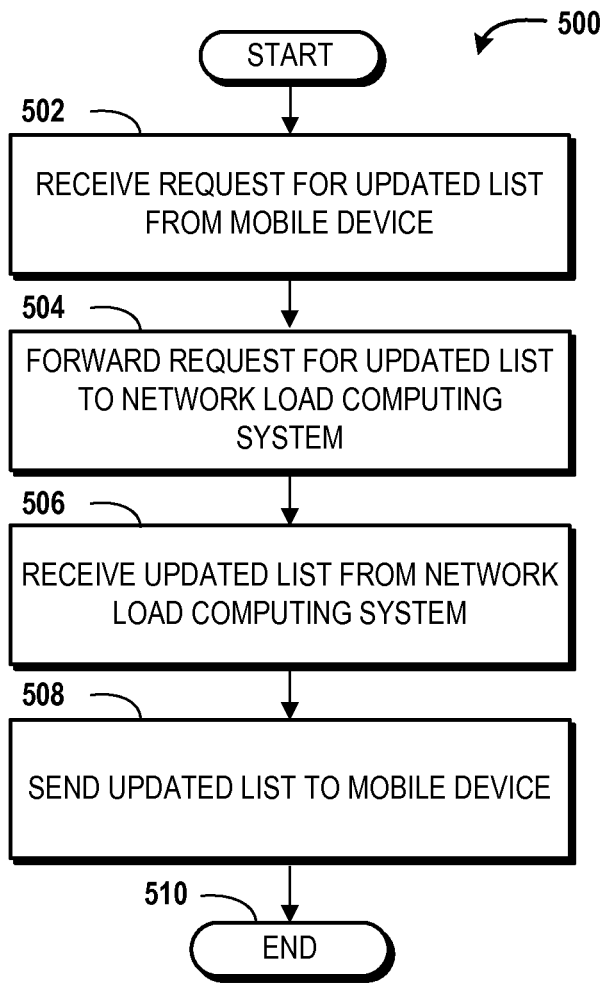
FIG. 5 is a flow diagram illustrating aspects of a method for providing updated preferred data transfer criteria to a mobile device, according to an illustrative embodiment.

Turning now to FIG. 5, a flow diagram illustrating aspects of a method 500 for providing updated preferred data transfer criteria to a mobile device will be described, according to an illustrative embodiment. The method 500 is described as being performed by the API server computer 116. The method 500 begins and proceeds to operation 502, wherein the API server computer 116 receives a request for an updated list from the mobile device 102. From operation 502, the method 500 proceeds to operation 504, wherein the API server computer 116 forwards the request for the updated list to the network load computing system 110. From operation 504, the method 500 proceeds to operation 506, wherein the API server computer 116 receives the updated list from the network load computing system 110 and sends the updated list to the mobile device 102 at operation 508. From operation 508, the method 500 proceeds to operation 510, wherein the method 500 may end.

Figure 6:
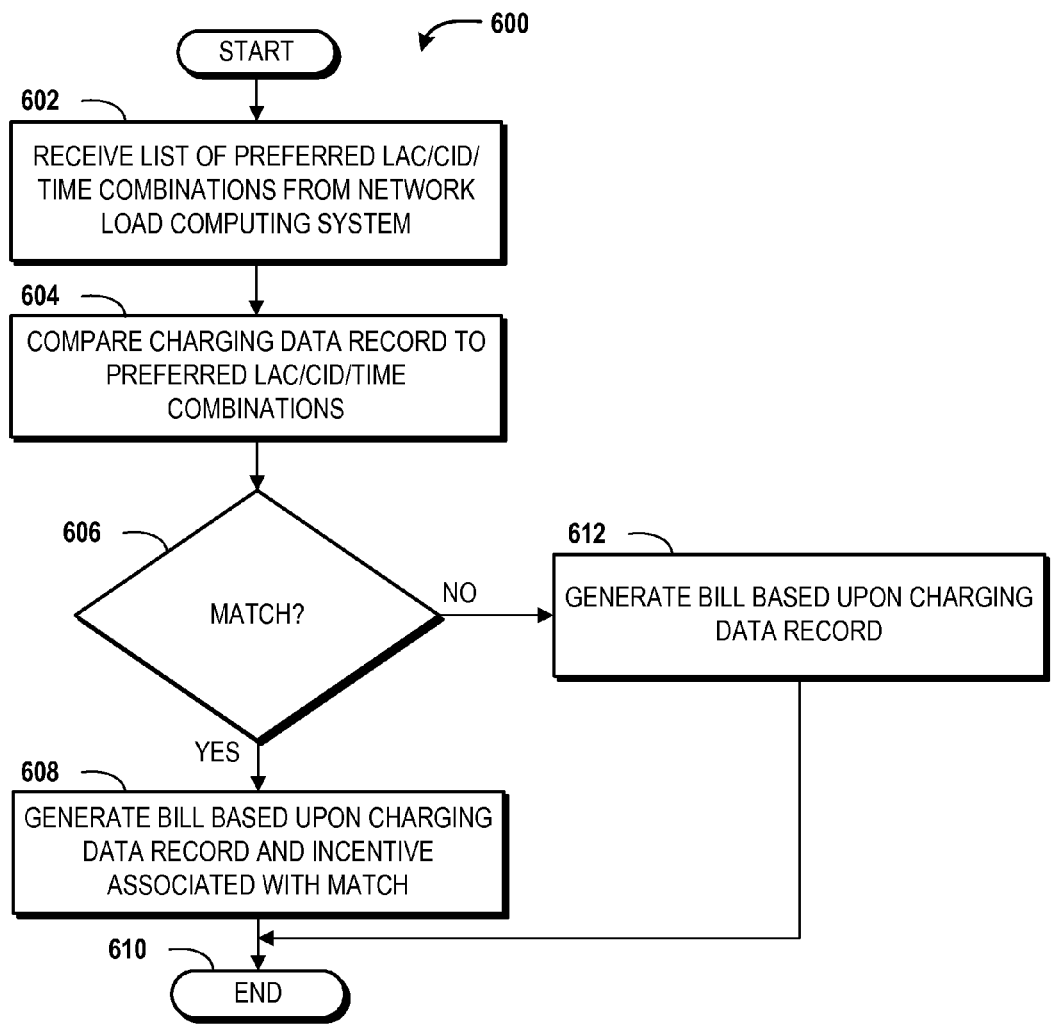
FIG. 6 is a flow diagram illustrating aspects of a method for generating a bill for data service, according to an illustrative embodiment.

Turning now to FIG. 6, a flow diagram illustrating aspects of a method 600 for generating a bill for wireless data service will be described, according to an illustrative embodiment. The method 600 is described as being performed by the billing system 126. The method 600 begins and proceeds to operation 602, wherein the billing system 126 receives a list of preferred LAC/CID/time combinations from the network load computing system 110. From operation 602, the method 600 proceeds to operation 604, wherein the billing system 126 compares a charging data record to the list of preferred LAC/CID/time combinations. As used herein, a "charging data record" is a formatted collection of information about a chargeable event for use by the billing system 126 to prepare a bill. The collection of information included for each chargeable event in a charging data record can include an indication of the LAC and CID associated with a BTS to which the mobile device 102 was connected during a data transfer event and an indication of a time during which the data transfer event took place. The comparison at operation 604 can include comparing chargeable events associated with data transferred to the mobile device 102 over the mobile telecommunications network 104 and/or data transferred from the mobile device 102 over the mobile telecommunications network 104 to the preferred LAC/CID/time combinations included in the list.

From operation 604, the method 600 proceeds to operation 606, wherein the billing system 126 determines if a match exists based upon the comparison. If the billing system 126 determines that a match exists, the method 600 proceeds to operation 608, wherein the billing system 126 generates a bill based upon the charging data record and an incentive associated with the match. As explained above, the incentive can be applied as a bill credit or a data block credit. From operation 612, the method 600 proceeds to operation 610, wherein the method 600 may end. If, however, the billing system 126 determines that a match does not exist, the method 600 proceeds to operation 612, wherein the billing system 126 generates a bill based upon the charging data record. From operation 608, the method 600 proceeds to operation 610, wherein the method 600 may end.

Figure 7:
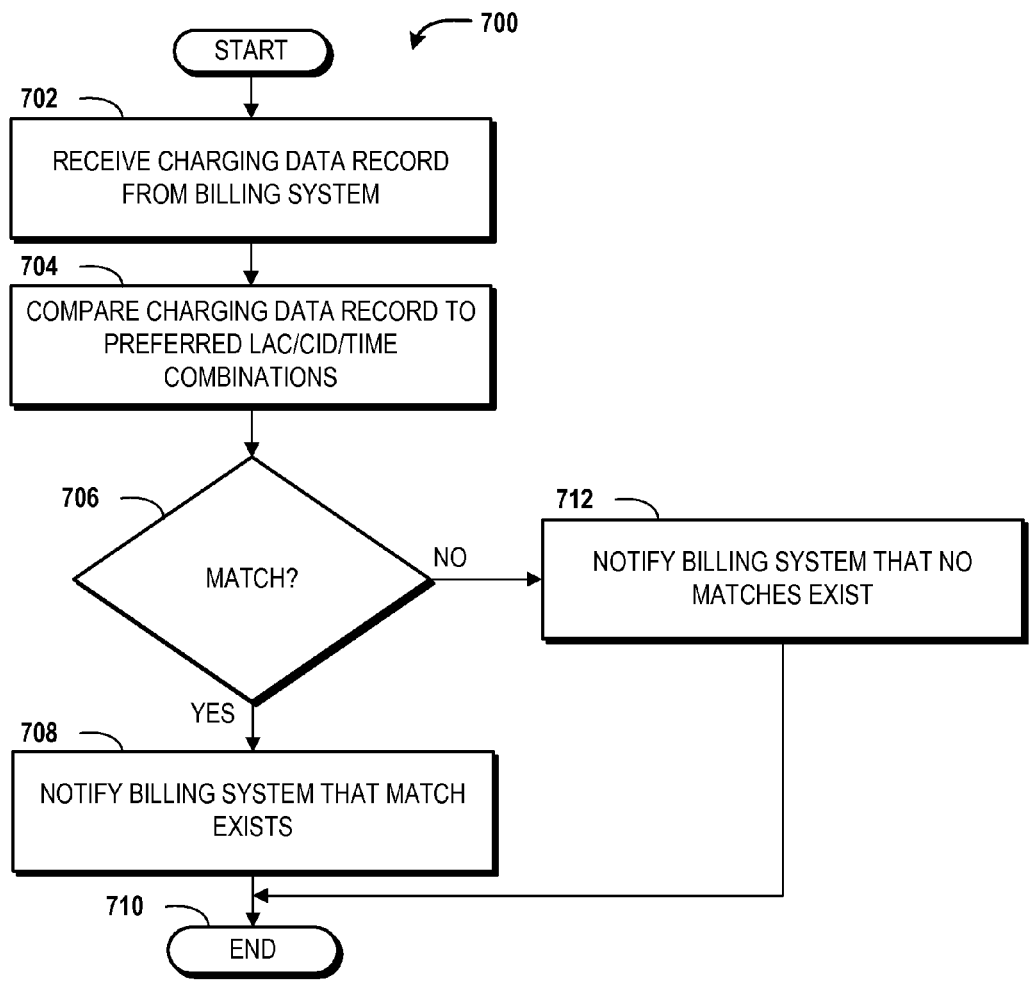
FIG. 7 is a flow diagram illustrating aspects of a method for comparing charging data records to preferred data transfer criteria, according to an illustrative embodiment.

Turning now to FIG. 7, a flow diagram illustrating aspects of a method 700 for comparing charging data records to preferred data transfer criteria will be described, according to an illustrative embodiment. The method 700 is described as being performed by the network load computing system 110. The method 700 begins and proceeds to operation 702, wherein the network load computing system 110 receives a charging data record from the billing system 126. From operation 702, the method 700 proceeds to operation 704, wherein the network load computing system 110 compares the charging data record to a list of preferred LAC/CID/time combinations. From operation 704, the method 700 proceeds to operation 706, wherein the network load computing system 110 determines if a match exists based upon the comparison. If the network load computing system 110 determines a match exists, the method 700 proceeds to operation 708, wherein the network load computing system 110 notifies the billing system 126 that a match exists. From operation 708, the method 700 proceeds to operation 710, wherein the method 700 may end. If, however, the network load computing system 110 determines a match does not exist, the method 700 proceeds to operation 712, wherein the network load computing system 110 notifies the billing system 126 that no match exists. From operation 712, the method 700 proceeds to operation 710, wherein the method 700 may end.

Figure 8:
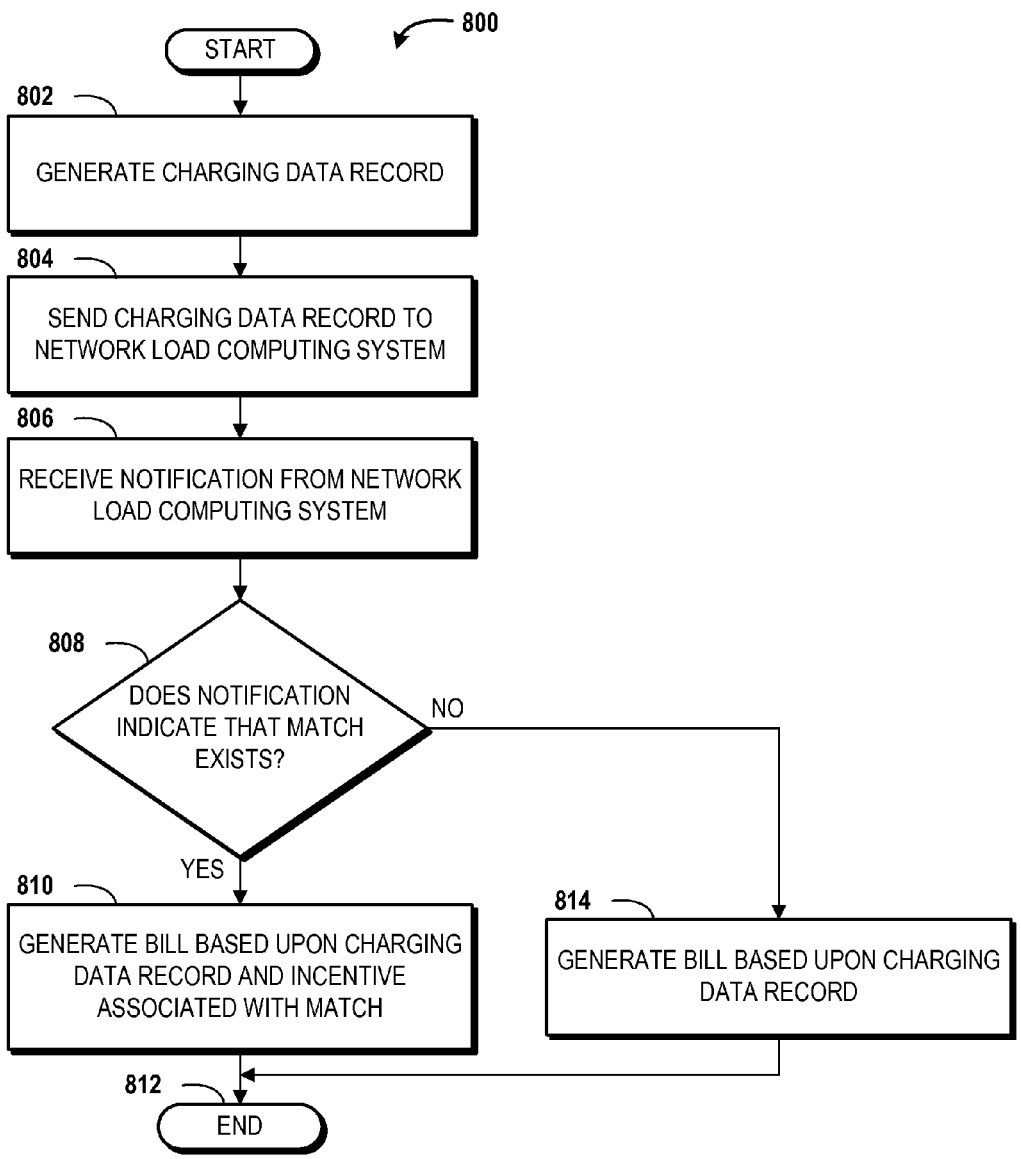
FIG. 8 is a flow diagram illustrating aspects of another method for generating a bill for data service, according to an illustrative embodiment.

Turning now to FIG. 8, a flow diagram illustrating aspects of a method 800 for generating a bill for wireless data service will be described, according to an illustrative embodiment. The method 800 is described as being performed by the billing system 126. The method 800 begins and proceeds to operation 802, wherein the billing system 126 generates a charging data record. The billing system 126 sends the charging data record to the network load computing system 110 at operation 804. From operation 804, the method 800 proceeds to operation 806, wherein the billing system 126 receives a notification from the network load computing system 110. From operation 806, the method 800 proceeds to operation 810, wherein the billing system 126 generates a bill based upon the charging data record and an incentive associated with the match. As explained above, the incentive can be applied as a bill credit or a data block credit. From operation 810, the method 800 proceeds to operation 812, wherein the method 800 may end. If, however, the network load computing system 110 determines a match does not exist, the method 800 proceeds to operation 814, wherein the billing system 126 generates a bill based upon the charging data record. From operation 814, the method 800 proceeds to operation 812, wherein the method 800 may end.

Figure 9:
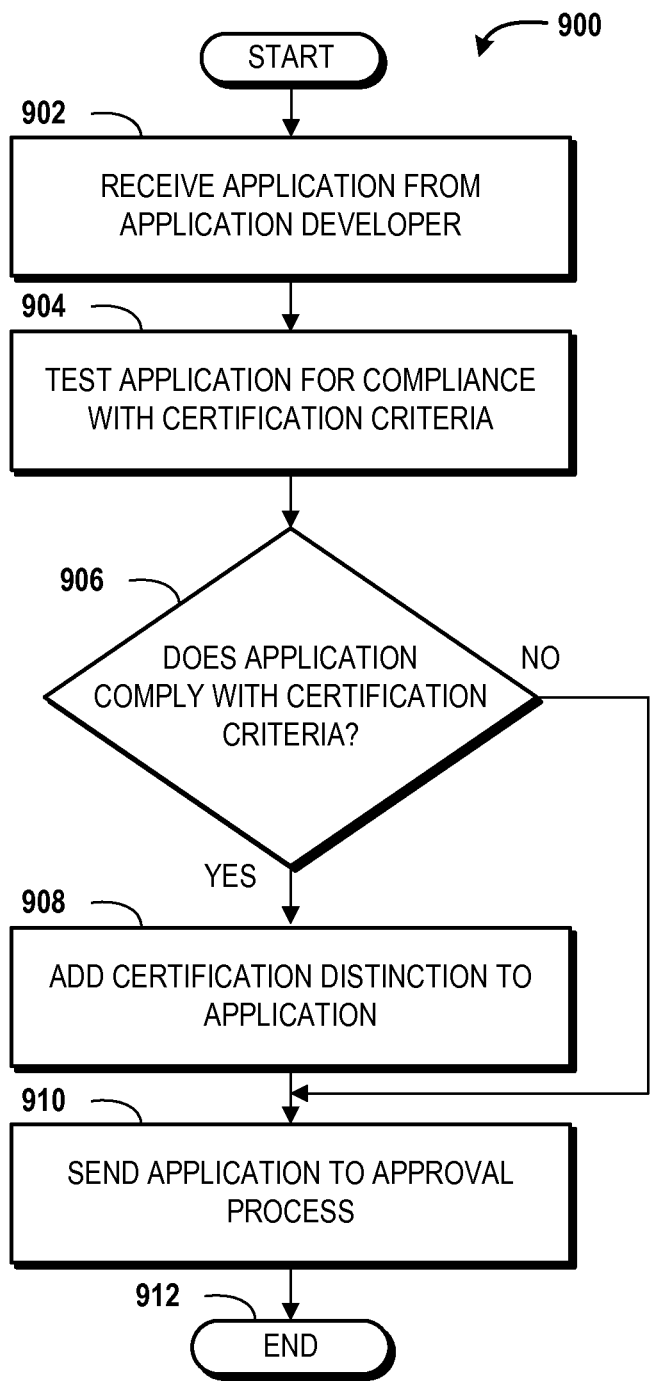
FIG. 9 is a flow diagram illustrating aspects of a method for certifying application programs, according to an illustrative embodiment.

Turning now to FIG. 9, a flow diagram illustrating aspects of a method 900 for certifying application programs will be described, according to an illustrative embodiment. The method 900 is described as being performed by the application certification system 132. The method 900 begins and proceeds to operation 902, wherein the application certification system 132 receives an application program from an application developer. From operation 902, the method 900 proceeds to operation 904, wherein the application certification system 132 tests the application for compliance with certification criteria. In some embodiments, the operation 904 includes testing the application program for interoperability with the network load application program 122 to access the list 114 to determine when data access is incentivized and when data access is not incentivized. In some embodiments, the operation 904 includes testing the application program to obtain data usage characteristics and comparing the data usage characteristics to data usage limits to which the application program must adhere to be certified. In some embodiments, the operation 904 includes testing the application program to determine whether the application program has an upload and download setting that, when enabled, causes the application program to enter a data conservation mode that limits data usage by the application program. In some embodiments, the operation 904 includes testing the application program to determine whether the application program has a default value set to a data conservation mode that limits data usage by the application program. In some embodiments, the operation 904 includes testing the application program to determine whether the application program complies with a requirement to limit data usage to the preferred combinations of LAC, CID, and times set forth in the list.

From operation 904, the method 900 proceeds to operation 906, wherein the application certification system 132 determines if the application program complies with the certification criteria. If the application certification system 132 determines the application complies with the certification criteria, the method 900 proceeds to operation 908, wherein the application certification system 132 adds a certification distinction to the application. In some embodiments, the certification distinction is used as a marketing tool to identify the application program as being certified within the application marketplace system 130. From operation 908, the method 900 proceeds to operation 910, wherein the application certification system 132 sends the application program to an approval process, such as an approval process performed by an owner and/or operator of the application marketplace system 130. If, however, the application certification system 132 determines the application program does not comply with the certification criteria, the method 900 proceeds directly to operation 910. From operation 910, the method 900 proceeds to operation 912, wherein the method 900 may end.

Figure 10:
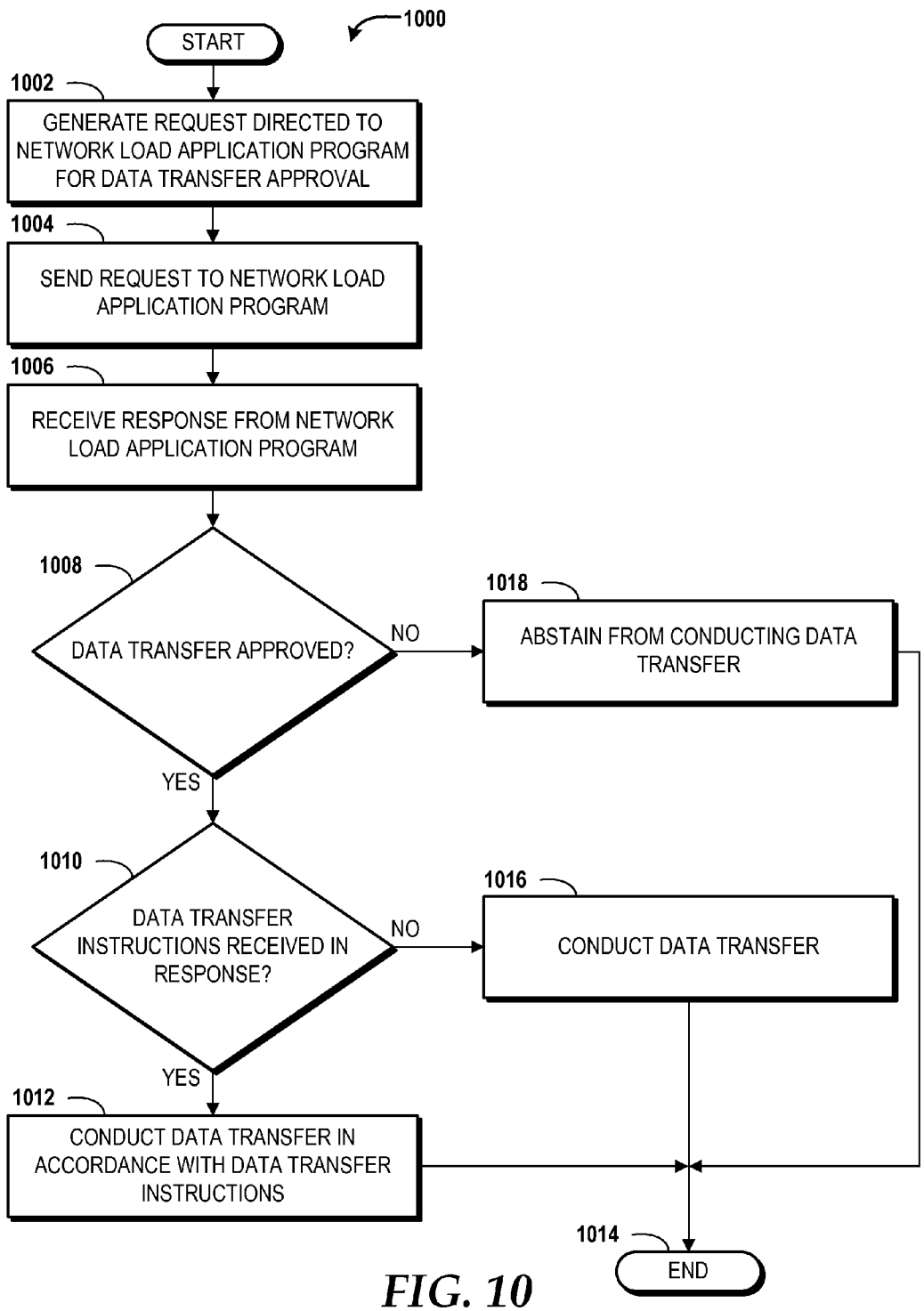
FIG. 10 is a flow diagram illustrating aspects of a method for conducting a data transfer or abstaining from conducting a data transfer based upon network load, according to an illustrative embodiment.

Turning now to FIG. 10, a flow diagram illustrating aspects of a method 1000 for conducting a data transfer or abstaining from conducting a data transfer based upon network load will be described, according to an illustrative embodiment. The method 1000 is described as being performed by the certified application program 124 executing on the mobile device 102. The method 1000 begins and proceeds to operation 1002, wherein the certified application program 124 generates a request directed to the network load application program 122 for data transfer approval. From operation 1002, the method 1000 proceeds to operation 1004, wherein the certified application program 124 sends the request to the network load application program 122.

From operation 1004, the method 1000 proceeds to operation 1006, wherein the certified application program 124 receives a response from the network load application program 122. The response indicates whether or not data transfer is approved. At operation 1008, the certified application program 124 determines if data transfer is approved. If the certified application program 124 determines that data transfer is approved, the method 1000 proceeds to operation 1010, wherein the certified application program 124 determines if data transfer instructions were received in the response. If data transfer instructions were received in the response, then the method 1000 proceeds to operation 1012, wherein the certified application program 124 conducts the data transfer in accordance with the data transfer instructions. The method 1000 then proceeds to operation 1014, wherein the method 1000 may end. If, however, data transfer instructions were not received in the response, then the method 1000 proceeds to operation 1016, wherein the certified application program 124 conducts the data transfer. The method 1000 then proceeds to operation 1014, wherein the method 1000 may end.

If, at operation 1008, the certified application program 124 determines that data transfer is not approved, the method 1000 proceeds to operation 1018, wherein the certified application program 124 abstains from conducting the data transfer. The method 1000 then proceeds to operation 1014, wherein the method 1000 may end.

Figure 11:
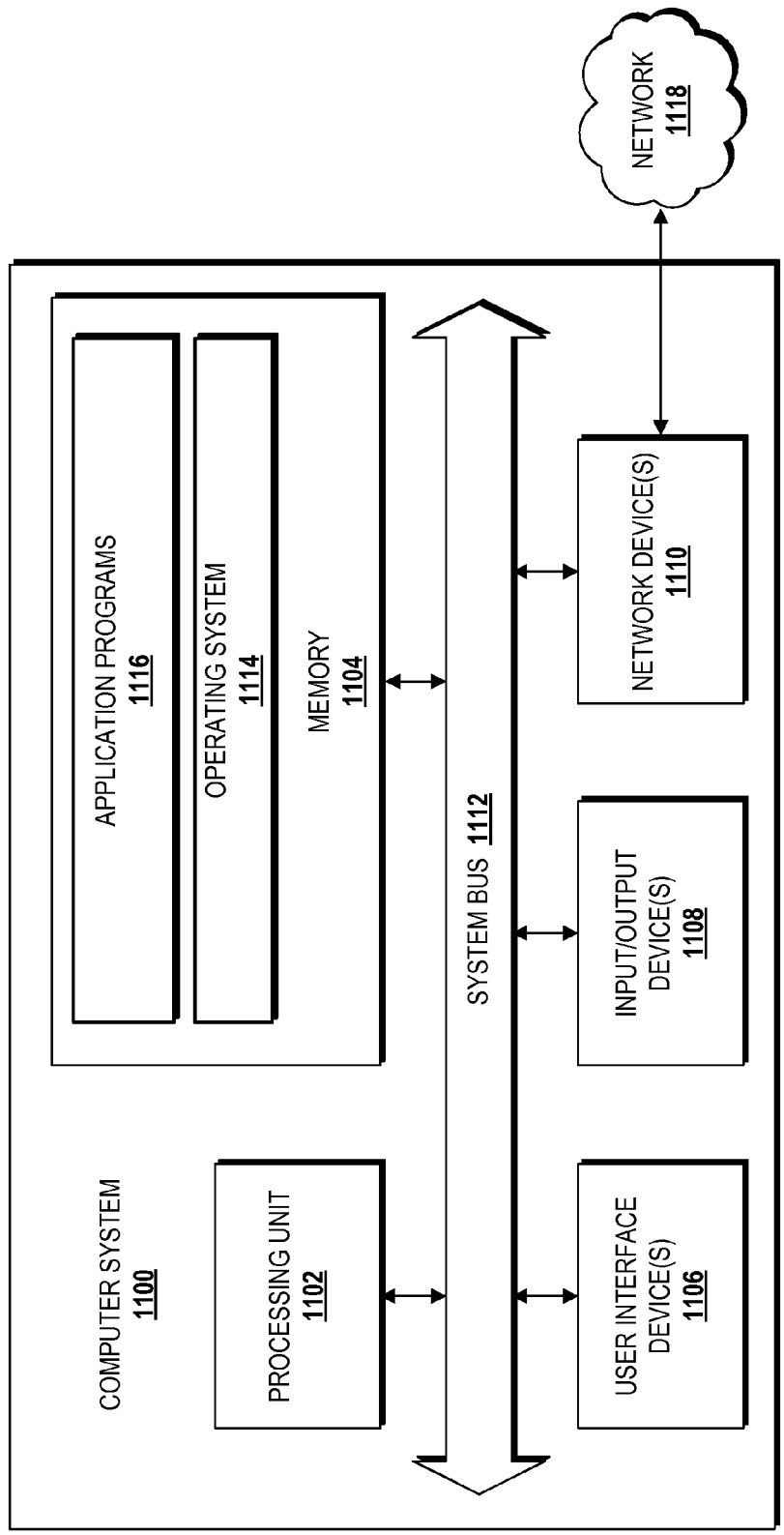
FIG. 11 is a computer architecture diagram illustrating an illustrative computer hardware and software architecture for a computing system capable of implementing aspects of the embodiments presented herein.

FIG. 11 is a block diagram illustrating a computer system 1100 configured to perform various operations disclosed herein. The computer system 1100 includes a processing unit 1102, a memory 1104, one or more user interface devices 1106, one or more input/output ("I/O") devices 1108, and one or more network devices 1110, each of which is operatively connected to a system bus 1112. The bus 1112 enables bi-directional communication between the processing unit 1102, the memory 1104, the user interface devices 1106, the I/O devices 1108, and the network devices 1110. In some embodiments, the network load computing system 110, the API server computing system 116, the billing system 126, the application marketplace system 130, and/or the application certification system 132 are configured like the computer system 1100. It should be understood, however, that the network load computing system 110, the API server computing system 116, the billing system 126, the application marketplace system 130, and/or the application certification system 132 may include additional functionality or include less functionality than now described.

The processing unit 1102 may be a standard central processor that performs arithmetic and logical operations, a more specific purpose programmable logic controller ("PLC"), a programmable gate array, or other type of processor known to those skilled in the art and suitable for controlling the operation of the computer system 1100. Processing units are generally known, and therefore are not described in further detail herein.

The memory 1104 communicates with the processing unit 1102 via the system bus 1112. In some embodiments, the memory 1104 is operatively connected to a memory controller (not shown) that enables communication with the processing unit 1102 via the system bus 1112. The illustrated memory 1104 includes an operating system 1114 and one or more application programs 1116.

The operating system 1114 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like. The application programs 1116 can include computer-executable instructions that, when executed by the processing unit 1102, cause the computer system 1100 to perform operations such as those described herein above with reference to methods set forth in FIGS. 2-10.

The user interface devices 1106 may include one or more devices with which a user accesses the computer system 1100. The user interface devices 1106 may include, but are not limited to, computers, servers, personal digital assistants, telephones (e.g., cellular, IP, or landline), or any suitable computing devices. The I/O devices 1108 enable a user to interface with the program modules. In one embodiment, the I/O devices 1108 are operatively connected to an I/O controller (not shown) that enables communication with the processing unit 1102 via the system bus 1112. The I/O devices 1108 may include one or more input devices, such as, but not limited to, a keyboard, a mouse, or an electronic stylus. Further, the I/O devices 1108 may include one or more output devices, such as, but not limited to, a display screen or a printer.

The network devices 1110 enable the computer system 1100 to communicate with other networks or remote systems via a network 1118, such as one or more of the networks illustrated and described with reference to FIG. 1 and/or other network(s). Examples of the network devices 1110 include, but are not limited to, a modem, a radio frequency ("RF") or infrared ("IR") transceiver, a telephonic interface, a bridge, a router, or a network card. The network 1118 may include a wireless network such as, but not limited to, a WLAN such as a WI-FI network, a WWAN, a wireless personal area network ("WPAN") such as BLUETOOTH, or a wireless metropolitan area network ("WMAN"). Alternatively, the network 1118 may be a wired network such as, but not limited to, a wide area network ("WAN") such as the Internet, a local area network ("LAN") such as the Ethernet, a wired personal area network ("PAN"), or a wired metropolitan area network ("MAN").

The network 1118 embodied as a cellular network may utilize a mobile telecommunications technology such as, but not limited to, GSM, UMTS, CDMA ONE, CDMA2000, LTE, and various other 2G, 2.5G, 3G, 4G, and greater generation mobile telecommunications technologies. In addition, mobile data communications technologies such as GPRS, EDGE, the HSPA protocol family including HSDPA, EUL or otherwise termed HSUPA, HSPA+, and various other current and future mobile data communications technologies are contemplated for use by the network 1118. Therefore, the embodiments presented herein should not be construed as being limited to a particular mobile telecommunications technology and/or standards utilizing such technologies.

Figure 12:
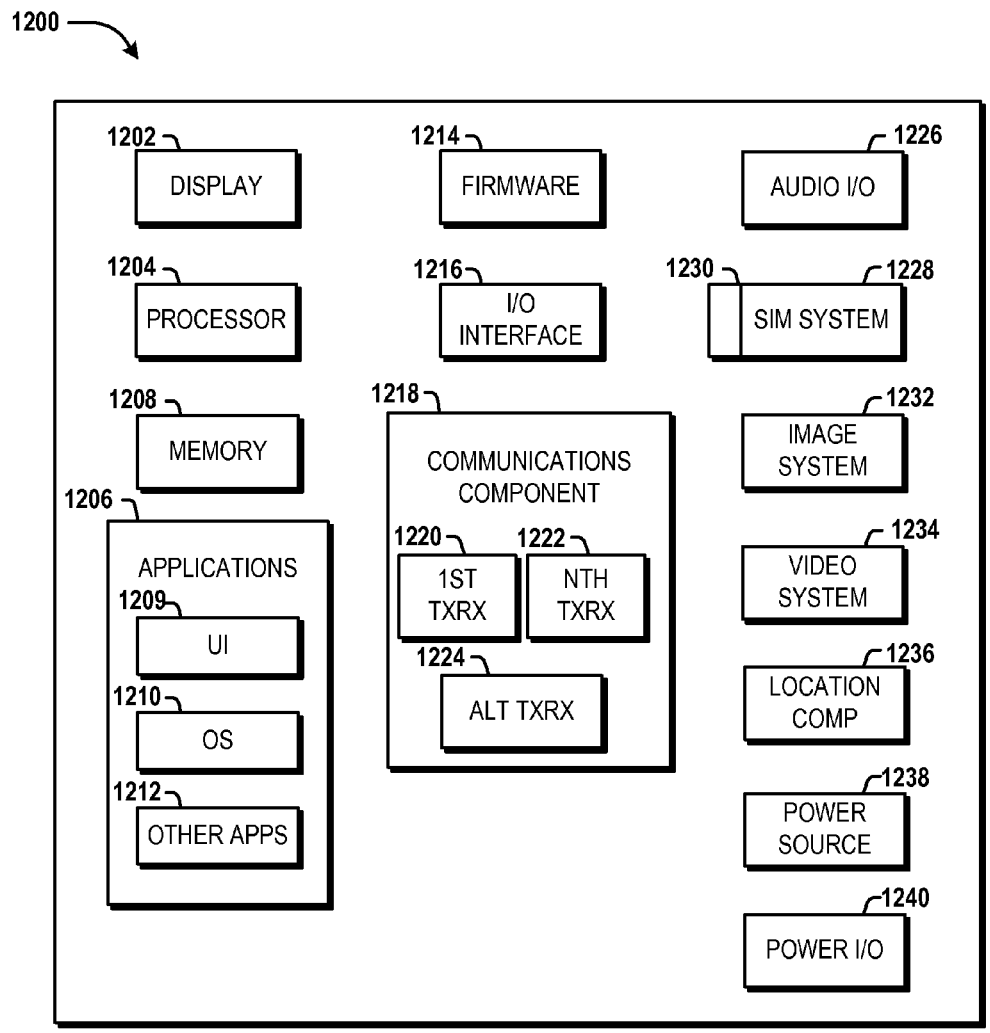
FIG. 12 is a mobile device architecture diagram illustrating an illustrative mobile device hardware and software architecture for a mobile device capable of implementing aspects of the embodiments disclosed herein.

Turning now to FIG. 12, an illustrative mobile device 1200 and components thereof will be described. In some embodiments, the mobile device 102 is configured like the mobile device 1200. It should be understood, however, that the mobile device 102 may include additional functionality or include less functionality than now described. Although connections are not shown between the components illustrated in FIG. 12, the components can interact with each other to carry out device functions. In some embodiments, the components are arranged so as to communicate via one or more busses (not shown). It should be understood that FIG. 12 and the following description are intended to provide a general understanding of a suitable environment in which various aspects of embodiments can be implemented.

As illustrated in FIG. 12, the mobile device 1200 includes a display 1202 for displaying data including, but not limited to, graphical user interface ("GUI") elements, text, images, video, virtual keypads and/or keyboards, messaging data, notification messages, metadata, internet content, device status, time, date, calendar data, device preferences, map and location data, combinations thereof, and/or the like. The mobile device 1200 also includes a processor 1204 for processing data and/or executing computer-executable instructions of one or more applications 1206, such as the application program 124, stored in a memory 1208. In some embodiments, the applications 1206 include a UI application 1209. The UI application 1209 interfaces with an operating system ("OS") application 1210, such as the operating system 120, to facilitate user interaction with device functionality and data. In some embodiments, the OS application 1210 is one of SYMBIAN OS from SYMBIAN LIMITED, WINDOWS MOBILE OS from MICROSOFT CORPORATION, WINDOWS PHONE OS from MICROSOFT CORPORATION, PALM WEBOS from HEWLETT PACKARD CORPORATION, BLACKBERRY OS from RESEARCH IN MOTION LIMITED, IOS from APPLE INC., and ANDROID OS from GOOGLE INC. These operating systems are merely illustrative of the operating systems that may be used in accordance with the embodiments disclosed herein.

The UI application 1209 aids a user in entering message content, viewing received messages, answering/initiating calls, entering/deleting data, entering and setting user IDs and passwords for device access, configuring settings, manipulating address book content and/or settings, multimode interaction, interacting with other applications 1212, and otherwise facilitating user interaction with the OS application 1210, and the other applications 1212.

In some embodiments, the other applications 1212 include, for example, certified application programs, non-certified application programs, the network load application program 122, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 1206 or portions thereof are stored in the memory 1208 and/or in a firmware 1214, and are executed by the processor 1204. The firmware 1214 may also store code for execution during device power up and power down operations.

The mobile device 1200 also includes an input/output ("I/O") interface 1216 for the input/output of data such as location information, presence status information, user IDs, passwords, and application initiation (start-up) requests. In some embodiments, the I/O interface 1216 is a hardwire connection such as a universal serial bus ("USB"), mini-USB, micro-USB, audio jack, PS2, IEEE 1394, serial, parallel, Ethernet (RJ45) port, RJ11 port, proprietary port, combinations thereof, or the like. In some embodiments, the mobile device 1200 is configured to synchronize with another device (e.g., a computer) to transfer content stored to/from the mobile device 1200. In some embodiments, the mobile device 1200 is configured to receive updates to one or more of the applications 1206 via the I/O interface 1216. In some embodiments, the I/O interface 1216 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1216 may be used for communications between the mobile device 1200 and a network device or local device instead of, or in addition to, a communications component 1218.

The communications component 1218 interfaces with the processor 1204 to facilitate wireless communications with one or more networks such as those illustrated in FIG. 1. In some embodiments, other networks include networks that utilize non-cellular wireless technologies such as WI-FI or WIMAX. In some embodiments, the communications component 1218 includes a multimode communications subsystem for facilitating communications via the cellular network and one or more other networks.

The communications component 1218, in some embodiments, includes one or more transceivers each configured to communicate over the same or a different wireless technology standard. For example, the transceivers of the communications component 1218 may be configured to communicate using GSM, CDMAONE, CDMA2000, LTE, and various other 2G, 2.5G, 3G, 4G, and greater generation technology standards. Moreover, the communications component 1218 may facilitate communications over various channel access methods (which may or may not be used by the aforementioned standards) including, but not limited to, TDMA, FDMA, W-CDMA, OFDM, SDMA, and the like. In addition, the communications component 1218 may facilitate data communications using GPRS, EDGE, the HSPA protocol family including HSDPA, EUL or otherwise termed HSUPA, HSPA+, and various other current and future wireless data access standards.

In the illustrated embodiment, the communications component 1218 includes a first cellular transceiver 1220 that operates in one mode (e.g., GSM), and an $N^{th}$ cellular transceiver 1222 operates in a different mode (e.g., UMTS). While only two cellular transceivers 1220, 1222 are illustrated, it should be appreciated that more than two transceivers can be included in the communications component 1218.

The illustrated communications component 1218 also includes an alternative communications transceiver 1224 for use by other communications technologies including WI-FI, WIMAX, BLUETOOTH, infrared, infrared data association ("IRDA"), near field communications ("NFC"), other RF, combinations thereof, and the like. In some embodiments, the communications component 1218 also facilitates reception from terrestrial radio networks, digital satellite radio networks, internet-based radio service networks, combinations thereof, and the like.

The communications component 1218 processes data from a network such as an internet, an intranet, a home broadband network, a WI-FI hotspot, and the like, via an internet service provider ("ISP"), digital subscriber line ("DSL") provider, or broadband provider.

Audio capabilities for the mobile device 1200 may be provided by an audio I/O component 1226 that includes a speaker for the output of audio signals and a microphone to collect audio signals.

The illustrated mobile device 1200 also includes a USIM system 1228 that includes a SIM slot interface 1230 for accommodating a USIM card. In some embodiments, the USIM system 1228 is configured to accept insertion of other SIM cards for access to other network types such as GSM. In other embodiments, the USIM system 1228 is configured to accept multiple SIM cards. In still other embodiments, the USIM system 1228 is configured to accept a universal integrated circuit card ("UICC") with one or more SIM applications stored thereupon.

The illustrated mobile device 1200 also includes an image capture and processing system 1232 ("image system"). Photos may be obtained via an associated image capture subsystem of the image system 1232, for example, a camera. The mobile device 1200 may also include a video system 1234 for capturing, processing, recording, and/or modifying video content. Photos and videos obtained using the image system 1232 and the video system 1234, respectively, may be added as message content to an MMS message and sent to another mobile device.

The illustrated mobile device 1200 also includes a location component 1236 for sending and/or receiving signals such as GPS data, assisted-GPS data, WI-FI/WIMAX and/or cellular network triangulation data, combinations thereof, and the like, for determining a location of the mobile device 1200. The location component 1236 may communicate with the communications component 1218 to retrieve triangulation data for determining a location of the mobile device 1200. In some embodiments, the location component 1236 interfaces with cellular network nodes, telephone lines, satellites, location transmitters and/or beacons, wireless network transmitters and receivers, combinations thereof, and the like. In some embodiments, the location component 1236 includes one or more sensors such as a compass, an accelerometer, and/or a gyroscope to determine the orientation of the mobile device 1200. Using the location component 1236, the mobile device 1200 can generate and/or receive data to identify its location, or transmit data used by other devices to determine the location of the mobile device 1200. The location component 1236 may include multiple components for determining the location and/or orientation of the mobile device 1200.

The illustrated mobile device 1200 also includes a power source 1238, such as one or more batteries and/or other power subsystem (AC or DC). The power source 1238 may interface with an external power system or charging equipment via a power I/O component 1240.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 1200 or other devices or computers described herein, such as the computer system described above with reference to FIG. 11. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the mobile device 1200 in order to store and execute the software components presented herein. It is also contemplated that the mobile device 1200 may not include all of the components shown in FIG. 12, may include other components that are not explicitly shown in FIG. 12, or may utilize an architecture completely different than that shown in FIG. 12.

Based on the foregoing, it should be appreciated that concepts and technologies for managing network load using device application programs have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

We claim:

1. A mobile device, comprising:
   a processor; and a memory comprising instructions that, when executed by the processor, cause the processor to perform operations comprising executing an application programming interface called by a certified application program to interact with a network load application program to obtain a list generated by a network load computing system, wherein the list is generated based, at least in part, upon network load data associated with a network load of a mobile telecommunications network on which the mobile device is operating, wherein the list is for management of data transfers between the certified application program and the mobile telecommunications network, and wherein the certified application program comprises a certification candidate application program that has been certified through a certification process performed by an application certification system to certify that the certification candidate application program is interoperable with the network load application program, receiving the list comprising preferred combinations of location area codes, cell IDs, and times that data access by the certified application program executing on the mobile device is to be incentivized, determining a current location area code associated with a location area within which the mobile device is currently located, a current cell ID associated with a base transceiver station to which the mobile device is currently connected, and a current time, determining if the current location area code, the current cell ID, and the current time are included as a preferred combination in the list, and providing an indication that data access by the mobile device is incentivized if the current location area code, the current cell ID, and the current time are included in the list as the preferred combination.

2. The mobile device of claim 1, wherein the operations further comprise providing an indication that data access by the mobile device is not incentivized if the current location area code, the current cell ID, and the current time are not included in the list as the preferred combination.

3. The mobile device of claim 1, further comprising a display, and wherein providing the indication that data access by the mobile device is incentivized comprises providing, on the display, a visual indication that data access by the mobile device is incentivized.

4. The mobile device of claim 1, further comprising a speaker, and wherein providing the indication that data access by the mobile device is incentivized comprises providing, via the speaker, an audio indication that data access by the mobile device is incentivized.

5. The mobile device of claim 1, wherein providing the indication that data access by the mobile device is incentivized comprises providing the indication via the certified application program so as to notify a user of the mobile device that data access by the certified application program is incentivized.

6. The mobile device of claim 5, wherein the certification process provides a distinction to the certified application program as at least meeting data usage criteria specified by a mobile telecommunication carrier associated with the mobile telecommunications network.

7. The mobile device of claim 1, wherein the memory further comprises an operating system, and providing the indication that data access by the mobile device is incentivized comprises providing the indication via a notification feature of the operating system.

8. The mobile device of claim 1, wherein the operations further comprise:
    determining if the current location area code, the current cell ID, and the current time are included in the list;
    if the current location area code, the current cell ID, and current time are not included in the list,
        determining the list is out-of-date,
        generating a request for an updated list,
        sending the request for the updated list to a server computer, and
        receiving, in response to the request, the updated list from the server computer, the updated list comprising updated preferred combinations of location area codes, cell IDs, and times that data access by the mobile device is to be incentivized.

9. The mobile device of claim 8, wherein determining if the current location area code, the current cell ID, and the current time are included as the preferred combination in the list comprises determining if the current location area code, the current cell ID, and the current time are included as the preferred combination in the updated list.

10. A computer-readable storage medium having instructions stored thereon that, when executed by a processor of a mobile device, cause the mobile device to perform operations comprising:
    executing an application programming interface called by a certified application program to interact with a network load application program to obtain a list generated by a network load computing system, wherein the list is generated based, at least in part, upon network load data associated with a network load of a mobile telecommunications network on which the mobile device is operating, wherein the list is for management of data transfers between the certified application program and the mobile telecommunications network, and wherein the certified application program comprises a certification candidate application program that has been certified through a certification process performed by an application certification system to certify that the certification candidate application program is interoperable with the network load application program;
    receiving the list comprising preferred combinations of location area codes, cell IDs, and times that data access by certified application program executing on the the mobile device is to be incentivized;
    determining a current location area code associated with a location area within which the mobile device is currently located, a current cell ID associated with a base transceiver station to which the mobile device is currently connected, and a current time;
    determining if the current location area code, the current cell ID, and the current time are included as a preferred combination in the list; and
    providing an indication that data access by the mobile device is incentivized if the current location area code, the current cell ID, and the current time are included in the list as the preferred combination.

11. The computer-readable storage medium of claim 10, wherein the operations further comprise providing an indication that data access by the mobile device is not incentivized if the current location area code, the current cell ID, and the current time are not included in the list as the preferred combination.

12. The computer-readable storage medium of claim 10, wherein providing the indication that data access by the mobile device is incentivized comprises providing, on a display, a visual indication that data access by the mobile device is incentivized.

13. The computer-readable storage medium of claim 10, wherein providing the indication that data access by the mobile device is incentivized comprises providing, via a speaker, an audio indication that data access by the mobile device is incentivized.

14. The computer-readable storage medium of claim 10, wherein the operations further comprise:
   determining if the current location area code, the current cell ID, and the current time are included in the list;
   if the current location area code, the current cell ID, and current time are not included in the list,
      determining the list is out-of-date,
      generating a request for an updated list,
      sending the request for the updated list to a server computer, and
      receiving, in response to the request, the updated list from the server computer, the updated list comprising updated preferred combinations of location area codes, cell IDs, and times that data access by the mobile device is to be incentivized.

15. A method comprising:
   executing, by a mobile device, an application programming interface called by a certified application program to interact with a network load application program to obtain a list generated by a network load computing system, wherein the list is generated based, at least in part, upon network load data associated with a network load of a mobile telecommunications network on which the mobile device is operating, wherein the list is for management of data transfers between the certified application program and the mobile telecommunications network, and wherein the certified application program comprises a certification candidate application program that has been certified through a certification process performed by an application certification system to certify that the certification candidate application program is interoperable with the network load application program;
   receiving, by the mobile device, the list comprising preferred combinations of location area codes, cell IDs, and times that data access by the certified application program executing on the mobile device is to be incentivized;
   determining, by the mobile device, a current location area code associated with a location area within which the mobile device is currently located, a current cell ID associated with a base transceiver station to which the mobile device is currently connected, and a current time;
   determining, by the mobile device, if the current location area code, the current cell ID, and the current time are included as a preferred combination in the list; and
   providing, by the mobile device, an indication that data access by the mobile device is incentivized if the current location area code, the current cell ID, and the current time are included in the list as the preferred combination.

16. The method of claim 15, further comprising providing an indication that data access by the mobile device is not incentivized if the current location area code, the current cell ID, and the current time are not included in the list as the preferred combination.

17. The method of claim 15, wherein providing the indication that data access by the mobile device is incentivized comprises providing, on a display, a visual indication that data access by the mobile device is incentivized.

18. The method of claim 15, wherein providing the indication that data access by the mobile device is incentivized comprises providing, via a speaker, an audio indication that data access by the mobile device is incentivized.

19. The method of claim 15, further comprising:
   determining if the current location area code, the current cell ID, and the current time are included in the list;
   if the current location area code, the current cell ID, and current time are not included in the list,
      determining the list is out-of-date,
      generating a request for an updated list,
      sending the request for the updated list to a server computer, and
      receiving, in response to the request, the updated list from the server computer, the updated list comprising updated preferred combinations of location area codes, cell IDs, and times that data access by the mobile device is to be incentivized.

* * * * *